United States Patent [19]
Green et al.

[11] Patent Number: 5,992,226
[45] Date of Patent: Nov. 30, 1999

[54] APPARATUS AND METHOD FOR MEASURING INTERMOLECULAR INTERACTIONS BY ATOMIC FORCE MICROSCOPY

[75] Inventors: John-Bruce DeVault Green; Gil U Lee, both of Alexandria, Va.

[73] Assignee: The United States of America as represented by the Secretary of the Navy, Washington, D.C.

[21] Appl. No.: 09/074,541

[22] Filed: May 8, 1998

[51] Int. Cl.$^6$ .................................................. G01N 27/00
[52] U.S. Cl. ........................................................... 73/105
[58] Field of Search .............................. 73/105; 250/306, 250/307

[56] References Cited

U.S. PATENT DOCUMENTS

Re. 33,387   10/1990   Binning .
Re. 34,489   12/1993   Hansma et al. .

(List continued on next page.)

FOREIGN PATENT DOCUMENTS 8914071   2/1991   United Kingdom ..................... 73/105

OTHER PUBLICATIONS

Erlandsson et al., "Scanning Force Microscopy–Examples of Application to Surface Chemistry", received Jun. 1992, pp. 1–21.

Nakagawa et al., Discriminating Molecular Length of Chemically Absorbed Molecules Using an Atomic Force Microscope Having a Tip Covered With Sensor Molecules (An Atomic Force Microscope Having Chemical Sensing Function), Jpn. J. Appl. Phys., vol. 32, Par.

Florin E.–L. et al., "Adhesion Forces Between Individual Ligand–Receptor Pairs" Science 264 (1994) pp. 415–417.

Lee et al., "Sensing Discrete Streptavidin–Biotin Interactions with Atomic Force Microscopy" Langmuir, vol. 10 (2), (1994) pp. 354–357.

Dammer et al., "Specific Antigen/Antibody Interactions Measured by Force Microscopy" Biophysical Journal vol. 70 (May 1996) pp. 2437–2441.

Chilikoti et al., "The Relationship Between Ligand–Binding Thermodynamics and Protein–Ligand Interaction Forces Measured by Atomic Force Microscopy" Biophysical Journal vol. 69 (Nov. 1995) pp. 2125–2130.

Allen S. et al., "Detection of Antigen–Antibody Binding Events with the Atomic Force Microscope" Biochemistry, vol. 36, No. 24 (1997) pp. 7457–7463.

Moy V.T. et al., "Adhesive Forces Between Ligand and Receptor Measured by AFM" Colloids and Sufaces A: Physicochemical and Engineering Aspects 93 (1994) pp. 343–348.

(List continued on next page.)

*Primary Examiner*—Daniel S. Larkin
*Attorney, Agent, or Firm*—Barry A. Edelberg; Ralph T. Webb

[57] ABSTRACT

A sample support member for atomic force microscopy of intermolecular interactions includes a sample support base having a plurality of protrusions, each protrusion having an apical substrate region or tip that has been chemically modified by the immobilization thereon of a sample compound or of a linking compound that is capable of binding a sample compound. A reference compound support member has a surface region having at least one reference compound immobilized thereon.

The relative position and orientation of the reference compound support member and the substrate support member are controlled to select a particular protrusion and to cause an interaction between a reference compound immobilized on the surface region of the free end of the cantilever and the sample compound immobilized on the apical substrate area of the selected protrusion. A physical parameter associated with the interaction between the reference compound and the sample compound can be measured.

50 Claims, 4 Drawing Sheets

U.S. PATENT DOCUMENTS

| | | | |
|---|---|---|---|
| 5,047,663 | 9/1991 | Finlan et al. | 250/306 |
| 5,106,729 | 4/1992 | Lindsay et al. | 250/306 X |
| 5,143,854 | 9/1992 | Pirrung et al. | 436/518 |
| 5,144,833 | 9/1992 | Amer et al. . | |
| 5,204,581 | 4/1993 | Andreadakis . | |
| 5,253,516 | 10/1993 | Elings et al. . | |
| 5,260,824 | 11/1993 | Okada et al. . | |
| 5,363,697 | 11/1994 | Nakagawa | 73/105 |
| 5,372,930 | 12/1994 | Colton et al. | 250/306 |
| 5,445,934 | 8/1995 | Fodor et al. | 435/6 |
| 5,463,897 | 11/1995 | Prater et al. . | |
| 5,519,212 | 5/1996 | Elings et al. | 73/105 X |
| 5,624,845 | 4/1997 | Wickramasinghe et al. | 250/306 X |
| 5,763,768 | 6/1998 | Henderson et al. | 73/105 |
| 5,874,668 | 2/1999 | Xu et al. | 73/105 |

OTHER PUBLICATIONS

Prater, C.B. et al., "Probing Nano–Scale Forces With The AFM" Digital Instruments, Application Notes, at http://www.di.com/AppNotes/ForcCurv/FCMain.html (1995).

"Ultrasharp Silicon Gratings" NT–MDT web site at http://www.ntmdt.ru/grating.htm and http://www.ntmdt.ru/manual/silgrat.htm.

APPARATUS AND METHOD FOR MEASURING INTERMOLECULAR INTERACTIONS BY ATOMIC FORCE MICROSCOPY

BACKGROUND OF THE INVENTION

1. Field of the Invention

The present invention relates generally to atomic force microscopy (AFM) and to apparatus and methods for measuring intermolecular interactions such as receptor/ligand, antibody/antigen and DNA interactions efficiently by atomic force microscopy.

2. Description of the Related Art

In conventional atomic force microscopy, a sample is scanned with a fine-tipped probe mounted on a cantilever, and deflections of the probe tip as it passes across the sample are measured to determine the topography of the sample. Deflections in the probe tip as it passes along the sample surface may be monitored by various methods, including optical reflection, interferometry, and piezoelectric strain gauge methods. See, for example, U.S. Pat. No. Re. 33,387 to Binnig, U.S. Pat. No. 5,144,833 to Amer et al, U.S. Pat. No. 5,463,897 to Prater et al, U.S. Pat. No. Re. 34,489 to Hansma et al and U.S. Pat. No. 5,260,824 to Okada et al, all of the above incorporated herein by reference.

In recent years, atomic force microscopy has been used to measure interfacial properties and intermolecular interactions such as elasticity, friction, adhesion, receptor/ligand interactions, and antibody/antigen interactions between individual molecules. To measure binding interactions between complimentary ligands and receptors, the probe tip of a cantilever and a sample surface may be chemically modified by various means to attach the complementary ligands and receptors to each. (For convenience, the compound or compounds immobilized on the cantilever or similar structures will be referred to herein as "reference" compounds and the compound or compounds immobilized on the sample support member or sample surface will be referred to herein as "sample" compounds.) The probe tip and sample surface may then be brought into proximity or into contact so that a ligand and a receptor interact or bond. When the probe tip and sample surface are then separated, the ligand-receptor bond breaks and the strength of the interaction force between the ligand and the receptor may be measured. The use of atomic force microscopy to study intermolecular forces is described, for example, in the following patents and publications, incorporated herein by reference: U.S. Pat. No. 5,363,697 to Nakagawa; U.S. Pat. No. 5,372,930 to Colton et al; Florin E.-L. et al, "Adhesion Forces Between Individual Ligand-Receptor Pairs" Science 264 (1994). pp 415–417; Lee, G.U et al, "Sensing Discrete Streptavidin-Biotin Interactions with Atomic Force Microscopy" Langmuir, vol. 10(2), (1994) pp 354–357; Dammer U. et al "Specific Antigen/Antibody Interactions Measured by Force Microscopy" Biophysical Journal Vol. 70 (May 1996) pp 2437–2441; Chilikoti A. et al, "The Relationship Between Ligand-Binding Thermodynamics and Protein-Ligand Interaction Forces Measured by Atomic Force Microscopy" Biophysical Journal Vol. 69 (November 1995) pp 2125–2130; Allen S. et al, "Detection of Antigen-Antibody Binding Events with the Atomic Force Microscope" Biochemistry, Vol. 36, No. 24 (1997) pp 7457–7463; and Moy V.T. et al, "Adhesive Forces Between Ligand and Receptor Measured by AFM" Colloids and Surfaces A: Physicochemical and Engineering Aspects 93 (1994) pp 343–348. If interactions between molecules are studied in liquids, the experimental conditions, such as pH, buffer/ionic concentration, buffer/ionic species, etc. may be varied to determine the effect that these have on the forces of interaction.

Atomic force microscopy has great potential for use in screening arrays of compounds, such as libraries of compounds produced by combinatorial methods, to identify useful ligand/receptor interactions and to discover useful drugs. Modem methods of combinatorial chemistry, parallel synthesis, and microlithography make it possible to produce large, compact libraries of chemical analogues in spatially addressable arrays. Atomic force microscopy with chemically modified probe tips provides a way of screening these arrays. However, the equipment and techniques currently used for atomic force microscopy are not well suited for repetitive measurements or efficient high-volume screening. In particular, chemically modified cantilever probe tips are fragile and easily damaged or inactivated. In a typical chemically modified cantilever probe tip, only the molecules that are bound to the very apex of the tip are available for force interactions with a substrate. The crucial area of the probe tip is typically very small and the number of molecules bound thereon is very few; if anything happens to damage those few molecules or to block access to, or to otherwise inactivate that small area of the probe tip, then the probe tip is rendered useless and must be replaced. Replacing the probe tip usually requires replacing the entire cantilever, a procedure that is expensive and time-consuming. Moreover, the typical cantilever probe tip has room for only one reference compound to be immobilized on the tip, so the cantilever must be replaced or modified whenever it is desired to use a different reference compound.

SUMMARY OF THE INVENTION

It has now been discovered that the limitations of atomic force microscopy for use in measuring intermolecular interactions as described above may be overcome by making two concurrent changes to the atomic force microscope apparatus. First, the sample support is modified so that instead of being a flat surface having molecules of the sample compound or compounds spread out over a relatively large area, it has a plurality of protrusions having molecules of the sample compound or compounds immobilized on the tips or apices of the protrusions. The sample support member of this invention may contain millions of these protrusions per square centimeter. Immobilizing the sample compounds onto the tips of protrusions instead of onto a flat surface places the sample compounds in more accessible position so that when one conducts measurements of molecular interactions of a sample compound with a reference compound, it is not necessary to put the reference compound on the end of a cantilever probe tip to access the sample molecules. Individual molecules of the sample compounds can be accessed by reference compounds that are immobilized on a surface on the cantilever. Thus, the second change to the atomic force apparatus is to modify the cantilever so that the reference compound or compounds are immobilized directly onto a surface region on the free end of the cantilever instead of on a probe tip.

In the operation of the atomic force microscope to measure molecular interactions according to the present invention, the surface region of the free end of the cantilever is brought into contact with or into proximity with a particular protrusion so that interactions between a molecule of the reference compound and a molecule of the sample compound can be measured. Piezoelectric translators currently used in atomic force microscopy are sufficiently precise so that a particular protrusion out of millions on the sample support member can be aligned with a particular portion of the surface region of the cantilever.

The protrusions in the present invention are analogous to the cantilever probe tip in conventional atomic force microscopy in that they allow a small number of individual molecules to be isolated in a small area in an accessible geometric configuration so that measurements on single molecules or on a small number of molecules may be taken. A major advantage of the present invention is that, whereas in conventional atomic force microscopy, there is only one probe tip, which located on the cantilever, in the present invention, there are numerous analogous structures, the protrusions, which are located on the sample support member. In a conventional atomic force microscope, if the cantilever probe tip is damaged or inactivated, an experiment must be halted until the tip is replaced. In the present invention, if a particular protrusion is damaged or inactivated, one may simply reposition the cantilever over a different protrusion having the same sample compound immobilized thereon and continue with the process of taking measurements. Thousands or millions of protrusions per square centimeter can be created and chemically modified with a sample compound or compounds.

The surface region of the cantilever can have billions or trillions of molecules of the reference compound immobilized on it, each of which is usable in the measurement of interactions with a sample compound immobilized on a protrusion. If molecules of the reference compound located on one part of the cantilever become damaged or inactivated in the course of an experiment, the cantilever may be repositioned so that undamaged, active molecules of the reference compound located on a different portion of the cantilever can be used instead. Moreover, the surface region of the cantilever can be subdivided into spatially addressable subregions each having a different reference compound immobilized thereon. A plurality of different reference compounds can be immobilized on discrete, spatially addressable subregions of the surface of the cantilever, so there is no need to replace the cantilever every time it is desired to use a different reference compound.

By making the changes to the sample support and to the cantilever as described above, it is now possible to use atomic force microscopy for efficient, high-volume screening of sample compounds and for taking repetitive measurements of molecular interactions so that results may be double-checked with statistical rigor without the researcher having to worry about needing to replace the cantilever in the middle of an experiment because of damage to or inactivation of the reference compound.

The apparatus and methods of the present invention are not limited to use with cantilever-based atomic force microscopy instruments. The sample support member may also be used to hold sample compounds for other types of scanning microscopy in addition to those that involve the use of a cantilever. In general terms, the sample compound or sample compounds are immobilized on the apical substrate regions of protrusions of a sample support member, and the reference compound or reference compounds are immobilized on the surface region of a reference compound support member. Any method known in the art may be used to control the relative position of the sample support member and the reference compound support member and to measure intermolecular interactions between sample compounds and reference compounds.

Accordingly, in one aspect, the invention provides a sample support member for atomic force microscopy comprising a sample support base having a plurality of protrusions, each protrusion having an apical substrate region that has been chemically modified by the immobilization thereon of a sample compound or of a linking compound that is capable of binding a sample compound, wherein the sample compounds or linking compounds on each of the protrusions may be the same or different.

In another aspect, the invention provides a cantilever for an atomic force microscope comprising a cantilever body having a fixed end and a free end, the free end having a surface region having a plurality of spatially addressable subregions, each subregion having been chemically modified by the immobilization of a different reference compound thereon.

In another aspect, the invention provides a cantilever for an atomic force microscope comprising a cantilever body having a fixed end and a free end, the free end having a surface region, the surface region having a plurality of beads of different size categories immobilized thereon, the beads having reference compounds immobilized thereon, wherein each size category of bead has a different reference compound immobilized thereon.

In another aspect, the invention provides an apparatus for measuring an interaction between a reference compound and at least one sample compound, the apparatus comprising a sample support member having a plurality of protrusions, each protrusion having an apical substrate region that has been chemically modified by the immobilization of a sample compound thereon, wherein the sample compounds on each of the protrusions may be the same or different, a reference compound support member having a surface region that has been chemically modified by the immobilization of at least one reference compound thereon, means for controlling the relative position and orientation of the reference compound support member and the sample support member to select a particular protrusion and to cause an interaction between the reference compound immobilized on the surface region of the reference compound support member and the sample compound immobilized on the apical substrate area of the selected protrusion, and means for measuring a physical parameter associated with the interaction between the reference compound and the sample compound.

In another aspect, the invention provides an apparatus for measuring an interaction between at least one reference compound and at least one sample compound by atomic force microscopy, the apparatus comprising a sample support member having a plurality of protrusions, each protrusion having an apical substrate region that has been chemically modified by the immobilization of a sample compound thereon, wherein the sample compounds on each of the protrusions may be the same or different, a cantilever having a fixed end and a free end, the free end having a surface region that has been chemically modified by the immobilization of at least one reference compound thereon, wherein the sample support member is adapted to interface with a sample stage portion of an atomic force microscope and the cantilever is adapted to interface with a cantilever-holding portion of an atomic force microscope.

In another aspect, the invention provides a method of assaying at least one sample compound for interaction with at least one reference compound, the method comprising the steps of (a) providing (1) a sample support member having a plurality of protrusions, each protrusion having an apical substrate region and (2) a reference compound support member having a surface region, (b) chemically modifying the apical substrate region of each protrusion of the sample support member to immobilize a sample compound thereon, wherein the sample compounds on each of the protrusions may be the same or different, (c) chemically modifying the surface region of the reference compound support member to immobilize at least one reference compound thereon, (d) coupling the sample support member and the reference compound support member to apparatus that includes means for controlling the relative position and orientation of the sample support member and the reference compound support member to select a particular protrusion of the sample support member and to cause an interaction between a reference compound immobilized on the surface region of the reference compound support member and the sample compound immobilized on the apical substrate area of the selected protrusion, and means for measuring a physical parameter associated with the interaction between the reference compound and the sample compound (e) controlling the relative position and orientation of the reference compound support member and the sample support member to select a particular protrusion and to cause an interaction between a reference compound and the sample compound immobilized on the selected protrusion, and (f) measuring a physical parameter associated with the interaction between the reference compound and the sample compound on the selected protrusion.

In another aspect, the invention provides a method of assaying at least one sample compound for interaction with at least one reference compound, the method comprising the steps of (a) providing an atomic force microscope that includes
a sample support member having a plurality of protrusions, each protrusion having an apical substrate region and
a cantilever having a fixed end and a free end, the free end having a surface region having a plurality of spatially addressable subregions, (b) chemically modifying the apical substrate region of each protrusion so that each protrusion has the same or a different sample compound immobilized thereon, (c) chemically modifying the spatially addressable subregions of the surface region of the free end of the cantilever to immobilize a different reference compound on each subregion, (d) controlling the relative position and orientation of the cantilever and the sample support member to select a particular subregion of the cantilever and a particular protrusion to cause an interaction between the reference compound immobilized on the selected subregion and the sample compound immobilized on the selected protrusion, and (e) measuring a physical parameter associated with the interaction between the selected reference compound and the selected sample compound.

In another aspect, the present invention provides a method of assaying at least one sample compound for interaction with at least one reference compound, the method comprising the steps of (a) providing an apparatus that includes
a sample support member having a planar array of tapered or rounded protrusions, wherein the height of each protrusions is between about 1 and about 10 $\mu$m, the apical radius of curvature of each protrusions is between about 5 and about 1000 nm, and the distance between adjacent protrusions is between about 2 and about 50 $\mu$m and wherein each protrusion has an apical substrate region that has been chemically modified by the immobilization of a sample compound thereon, wherein the sample compounds on each of the protrusions may be the same or different, and
a cantilever having a fixed end and a free end, the free end having a substantially flat surface region having an area of at least 0.01 square microns and wherein the surface region is subdivided into a plurality of spatially addressable subregions, (b) chemically modifying the apical substrate region of each protrusion to immobilize a sample compound thereon, wherein the sample compounds on each of the protrusions may be the same or different, (c) chemically modifying the spatially addressable subregions of the surface region of the free end of the cantilever to immobilize a different reference compound on each subregion, (d) coupling the sample support member to a sample stage portion of an atomic force microscope and coupling the cantilever to a cantilever-holding portion of the atomic force microscope, wherein the atomic force microscope includes means for controlling the relative position and orientation of the cantilever and the sample support member to select a particular protrusion and to cause an interaction between a reference compound immobilized on the surface region of the free end of the cantilever and the sample compound immobilized on the apical substrate area of the selected protrusion, and means for measuring a physical parameter associated with the interaction between the reference compound and the sample compound, (e) controlling the relative position and orientation of the cantilever and the sample support member to select a particular protrusion and to cause an interaction between a reference compound immobilized on the selected subregion and the sample compound immobilized on the selected protrusion, and (f) measuring a physical parameter associated with the interaction between the selected reference compound and the selected sample compound.

DETAILED DESCRIPTION OF THE PREFERRED EMBODIMENTS

Figure 1:
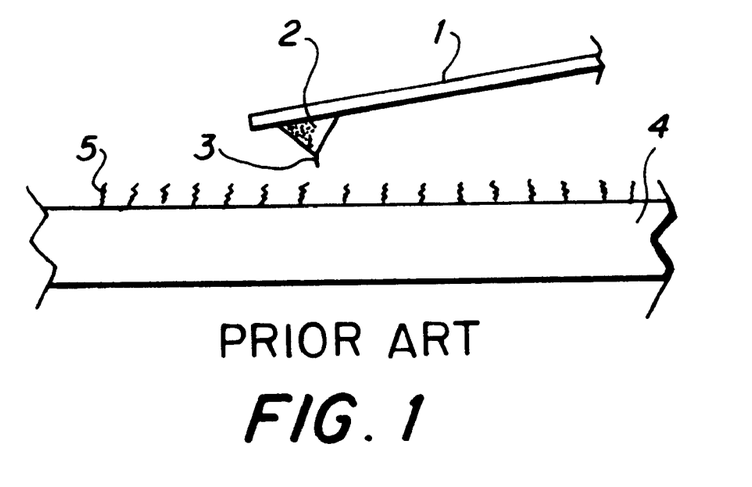
FIG. 1 (Prior art) is a schematic, enlarged representation of an interaction between a conventional cantilever and a conventional substrate.

As shown schematically in FIG. 1 (prior art), a conventional atomic force microscope cantilever 1 includes a sharp stylus or tip 2 that may be modified to immobilize molecules 3 thereon. The stylus is brought into contact with or proximity with a substrate 4 so that an interaction between molecules on the stylus and molecules 5 immobilized on the substrate can be measured.

Figure 2:
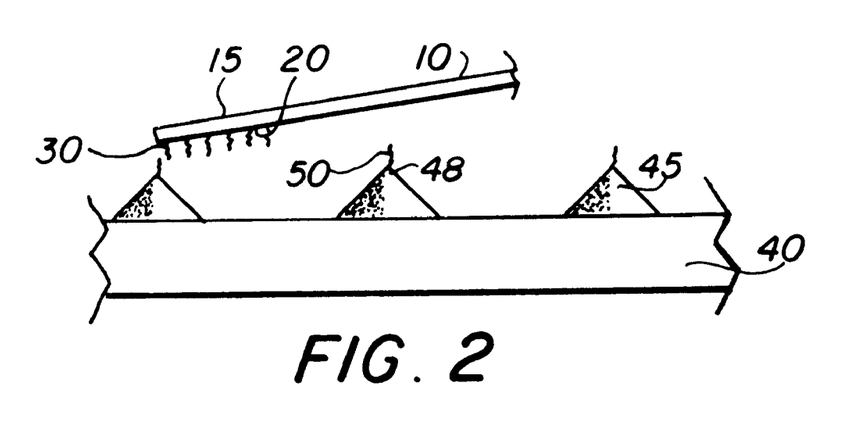
FIG. 2 is a schematic, enlarged representation of an interaction between a cantilever and a sample support member according to one embodiment of the present invention.

As shown schematically in FIG. 2, the apparatus of the present invention preferably includes a cantilever 10 that has a free end 15 that has a surface region 20 that is chemically modified to immobilize molecules 30 of a reference compound thereon. The sample support member 40 includes a plurality of protrusions 45 each having an apical substrate region 48 having sample molecules 50 immobilized thereon. According to the present invention, interactions between reference molecules and sample molecules may be measured by bringing the surface region of the cantilever into contact with or into proximity with the apical substrate region of one of the protrusions.

The sample support member includes a support base having a plurality of protrusions that each have a chemically modified apical substrate region. In general, the protrusions should be a size and shape that allows only a small number of molecules of the sample compound to be immobilized at the apex of each protrusion, so that individual molecules of the sample compound can be isolated for study. (Typically, the protrusions are visible only through an optical microscope and cannot be seen clearly by the naked eye.) Preferably, the protrusions are tapered or rounded with an apical radius of curvature between about 5 and about 1000 nm. The apical radius of curvature of a protrusion should be selected according to the coverage (the number of molecules per unit area) of the molecules of the sample compound to be immobilized thereon. For compounds that are in relatively low abundance or coverage, or that are difficult to immobilize, protrusions having relatively large radii of curvature should be used; for example, rounded or hemispherical shapes are preferred for these types of sample compounds. The large radius of curvature helps to increase the odds that every protrusion will have at least one sample molecule immobilized thereon. For molecules that are easy to immobilize with high coverage, tapered protrusions having relatively small radii of curvature should be used. Pyramidal or conical shapes are preferred for these types of sample compounds. The small radius of curvature helps to assure that even though a large number of molecules may become bound to each protrusion during the immobilization process, single molecules at the apices of the protrusions can be isolated for study. A sample support member can be constructed with a variety of protrusions having differing radii of curvature, so that the same support member can be used for immobilizing various types of sample compounds.

In principle, there is no limit to the overall size of the sample support member, although in practice, the size of the sample support member will generally be selected according to the size of the sample holding or stage area of the particular atomic force microscope instrument being used. The size and spacing of the protrusions may be selected to match the size of a particular cantilever or reference compound support member so that the apical substrate region of each protrusion is accessible to the cantilever or reference compound support member. In particular, the protrusions should be spaced apart at a distance greater than the width of the reference compound support member so that the reference compound support member may be maneuvered to address each protrusion without interference from neighboring protrusions. On the other hand, spacing the protrusions too far apart limits the number of protrusions that can be packed into a small area. Preferably, the width of the protrusions at their widest point is about 0.5–5 $\mu$m, and the distance between adjacent protrusions is about 2–50 $\mu$m. Thus, a sample support member that is a few square centimeters in size may have millions of protrusions.

In some atomic force microscopes, a cantilever is held at a fixed angle to the surface of the sample substrate while the cantilever and the substrate are moved relative to each other. If this type of microscope is used with a cantilever and sample support member of the present invention, then the height of the protrusions can affect how great of a surface area of the cantilever is accessible to the apex of the protrusions. If a protrusion is of insufficient height, the area of the cantilever that can be accessed in the direction away from the free end is limited because the free end would run into the sample support member. Preferably, the height of the protrusions is about 1–10 $\mu$m.

Figure 3:
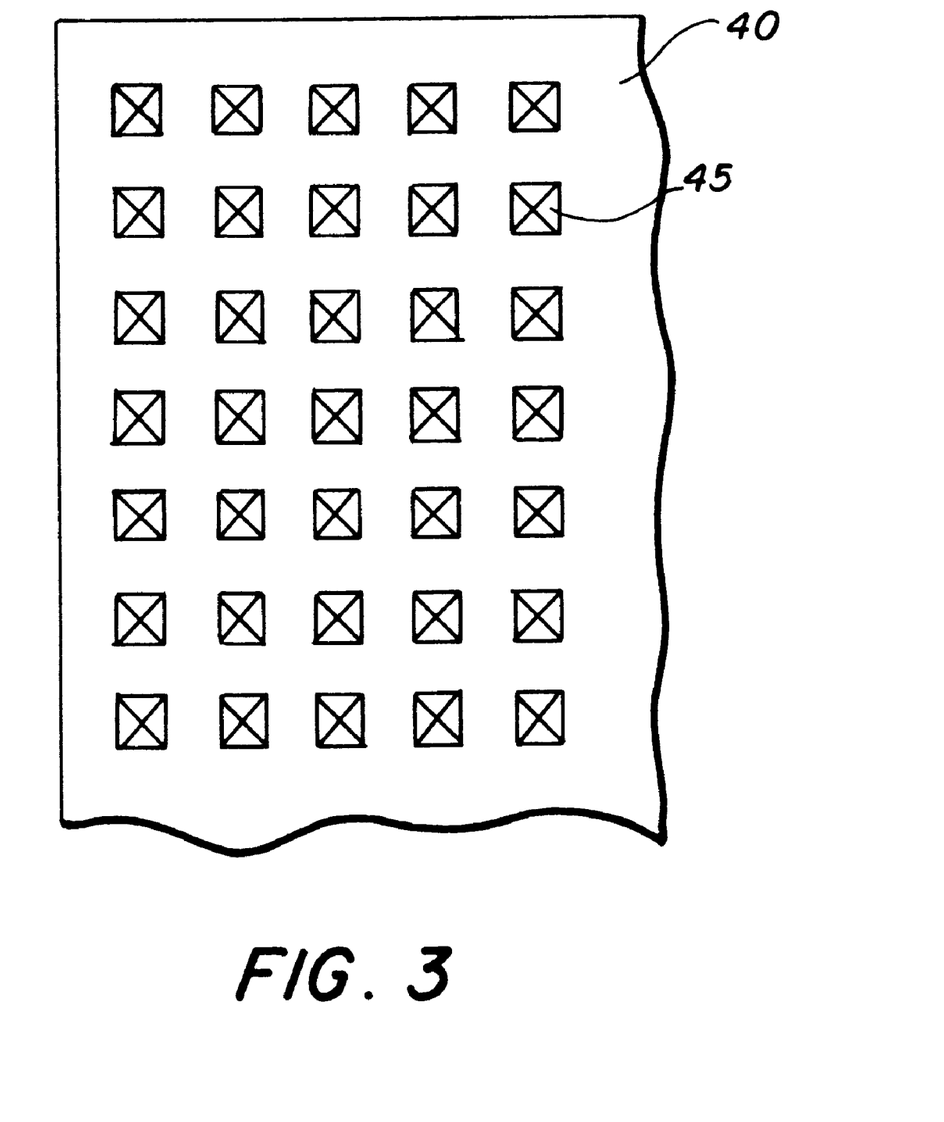
FIG. 3 is a schematic, enlarged representation top view of a portion of a sample support member according to one embodiment of the present invention.

As shown schematically in FIG. 3, the sample support member 40 will typically comprise a planar array of protrusions 45. Preferably, the protrusions are arranged in a regular pattern, such as a square array, so that it is easy to keep track of the location of any particular protrusion. For convenience in keeping track of the location of particular protrusions and distinguishing the protrusions from each other, the sample support base may include markings that are visible through an optical microscope. Also, for convenience in distinguishing particular protrusions, groups of protrusions may be separated by empty rows and columns.

Other configurations besides a planar array are possible. For example, the sample support member could be a terraced structure having at least one row of protrusions on each terrace.

The sample support member may be made of any material that can be microfabricated. Preferably, the sample support member is a silicon wafer. The protrusions are preferably integral with the support base and may be made by standard microfabrication techniques, such as photopatterning and etching of the sample support member. In particular, methods of microfabrication similar to those used to make conventional cantilever probe tips can be used to make the protrusions of the sample support member. For example, a method of making tapered microminiature silicon structures is described in U.S. Pat. No. 5,201,992 and U.S. Pat. No. 5,204,581 to Andreadakis, both incorporated herein by reference. The sample support member may also be made by casting in a microfabricated mold. The sample support member may be coated with one or more layers of material that is useful for binding specific types of sample compounds. For example, the sample support member may be coated with a layer of gold, which allows the immobilization of thiol-containing compounds.

The apical substrate regions of the protrusions are modified to immobilize sample compounds thereon by any method known in the art for covalently or non-covalently immobilizing a chemical or biochemical entity on a substrate. In particular, chemical methods used to modify conventional cantilever probe tips and sample surfaces can be used to modify the protrusions of the present invention. A general discussion of immobilization chemistry is found in Lee et al, "Chemically-specific Probes for the Atomic Force microscope", Israel Journal of Chemistry, Vol. 36, (1996), pp 81–87, incorporated herein by reference.

Electrochemical and electrostatic methods known in the art may also be used to immobilize sample compounds on the protrusions. For example, the electrostatic potential of the surface of the sample support member may be manipulated to concentrate sample compounds on the apices of the protrusions.

The sample compounds immobilized on the protrusions may be the same or different, depending on the type of research that is being conducted. For example, if a researcher is interested in studying only the interaction of a reference compound on the cantilever with only one specific sample compound, the sample support member can be modified so that only one compound is immobilized on the protrusions. On the other hand, if a researcher is interested in studying the interaction of a reference compound with a number of different sample compounds, the sample support member could be modified so that different compounds are immobilized on different, spatially addressable protrusions. Preferably, each sample compound would be immobilized on a number of protrusions, so that if one protrusion having a particular sample compound immobilized thereon becomes damaged, another protrusion having the same sample compound can be selected for study. Also, having each sample compound immobilized on a number of different protrusions allows for experiments to be repeated and for results to be double-checked with statistical rigor. Any patterning method known in the art, including, but not limited to, photo-patterning and $\mu$-contact printing, can be used to create arrays of protrusions having a different compounds immobilized thereon. If electrochemical methods are used to attach sample compounds to the protrusions, different sample compounds may be patterned onto the sample support member by using separate electrodes on different sections of the sample support member. Moreover, methods of combinatorial synthesis can be used to created combinatorial libraries in situ, with protrusions having different members of the combinatorial library immobilized thereon. Examples of methods of creating polypeptide or oligonucleotide arrays are disclosed in Fodor et al, "Light-Directed, Spatially Addressable Parallel Chemical Synthesis", Science, 251 (1991), pp 767–773, U.S. Pat. No. 5,143,854 to Pirrung et al and U.S. Pat. No. 5,445,934 to Fodor et al, the disclosures of which are incorporated herein by reference. The methods described in these references can be adapted to immobilize combinatorial libraries of sample compounds onto the protrusions of the present invention.

In immobilizing a sample compound or sample compounds on the apical substrate regions of the protrusions, it does not matter if a particular method used has the incidental effect of also immobilizing the sample compound on other portions of the sample support member, as long as access to the sample compound immobilized on the apical substrate region is not blocked.

By providing herein that the sample support member comprises a sample support base having a plurality of protrusions wherein "each protrusion" has an apical substrate region that is modified by the immobilization of a sample compound thereon, it is not meant to exclude from the scope of the invention instances wherein a sample support member also has protrusions that are not chemically modified. For example, a researcher may choose to chemically modify only a portion of a sample support member and to leave the remaining portion of the sample support member untouched. Or a sample compound may be so difficult to immobilize onto a substrate that only a fraction of the protrusions of a sample support member are successfully modified and the remaining protrusions are unmodified. These instances are within the scope of the invention.

The present invention also includes a sample support member that is modified to immobilize a linking compound on the apical substrate regions of the protrusions, wherein the linking compound is a compound that is capable of binding a sample compound. This embodiment provides flexibility by allowing a researcher to select a particular sample compound or sample compounds to bind to the sample support member at a point in time subsequent to the initial immobilization step. Any linking compound known in the art for binding a sample compound to a substrate may be used. Typical linking compounds are heterobifunctional crosslinkers that have a portion of the molecule that is functionalized to bind a particular type of substrate and a portion of the molecule that is functionalized to bind particular type of sample compound. For example, for binding the linking compound to a silicon substrate, the linking compound may have one or more silane functional groups of the formula $—O(CH_2)_n Si(OR)_{3-m} Cl_m$, wherein R is $CH_3$ or $CH_2 CH_3$, m is an integer from 0 to 3 and n is an integer from about 9 to about 25. For binding the linking compound to a gold-layered substrate, the linking compound may have one or more thiol functional groups. Likewise, the sample-binding portion of the linking compound may be selected to bind particular types of sample compounds such as proteins or nucleic acids. For example, the linking compound may include one or more maleimide groups that bind thiol-containing residues of polypeptides or the linking compound may include one or more succinimide groups that bind the amine groups of polypeptides or nucleic acids. The linking compound may also be photoactivatable so that the compound is capable of binding a sample compound only after it has been irradiated. Examples of photoactivatable linking compounds that can be immobilized on silicon are described in U.S. application Ser. No. 08/797,325 to Conrad et al, filed Feb. 10, 1997, incorporated herein by reference.

It is expected that the sample support member of the present invention will most commonly be used in atomic force microscopy with a cantilever, as described herein. However, the sample support member may also be used as a sample support for holding sample compounds for other types of probe-based microscopy such as scanning tunneling microscopy and scanning force microscopy, in any set-up where it would be advantageous to have a sample immobilized in a geometrically accessible fashion on the apices of a plurality of protrusions. Other mechanisms for force transduction and other types of platforms for holding a reference compound other than a conventional cantilever may also be used. As used in this application, the term "reference compound support member" refers to any structure, whether a cantilever or not, that provides a surface region on which the reference compound is immobilized so that it can be brought into a position to interact with the sample compound in a manner such that physical parameters associated with the interaction can be measured. A mechanism for force transduction may be coupled to the reference compound support member or the sample support member. For example, in one variation of scanning probe microscopy, described in Amrein, M. et al, "A Novel Force-sensing Arrangement for Combined Scanning Force/Scanning Tunnelling Microscopy Applied to Biological Objects" Journal of Microscopy, Vol. 179, Pt. Sep. 3, 1995, pp 261–265, and in Schenk, M. et al, "An Electret Microphone as a Force Sensor for Combined Scanning Probe Microscopy", Ultramicroscopy 65 (1996), pp 109–118, both incorporated herein by reference, a sample is mounted on top of a force transducer which is an electret microphone membrane, and deflections in the membrane in response to force exerted by a probe tip are measured. The sample support member of the present invention and reference compound support member could be adapted for this type of arrangement or similar set-ups where the sample support member is connected to a force transducer.

Figure 6:
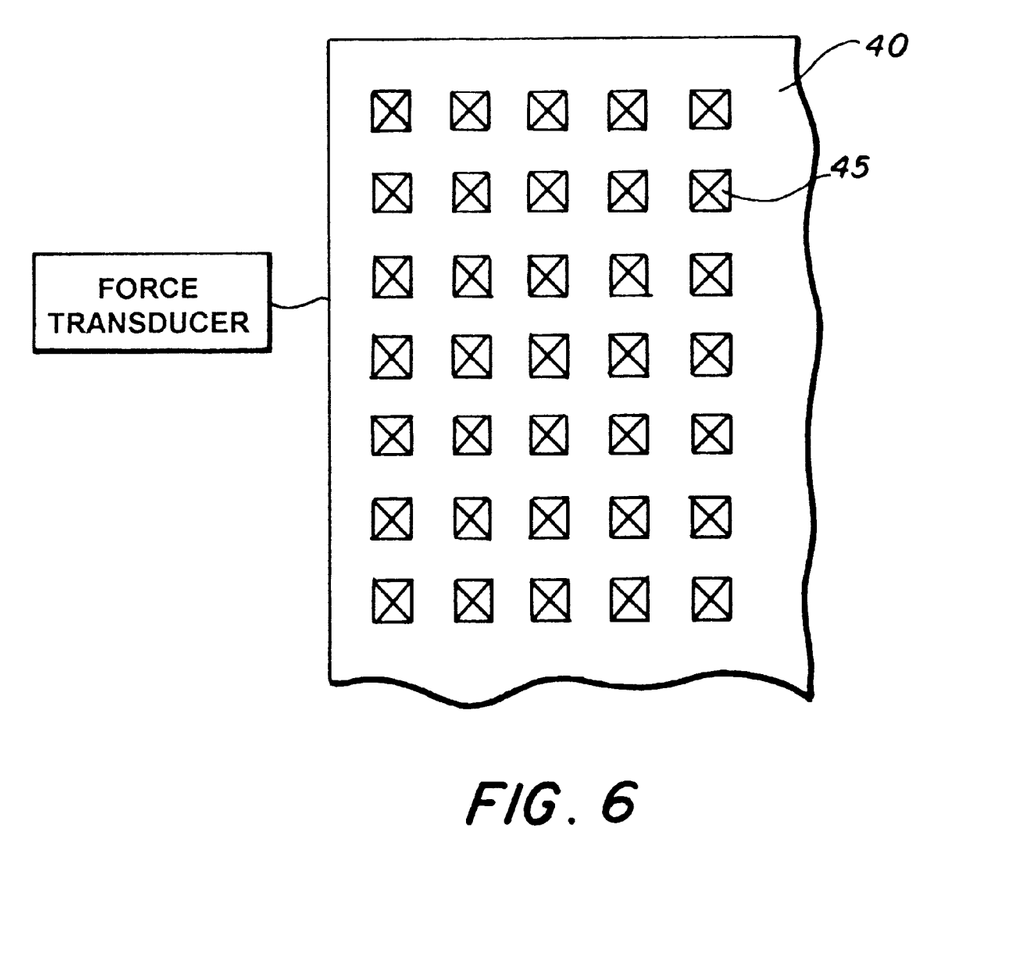
FIG. 6 is a schematic, enlarged top view of a sample support member coupled to a force transducer.

FIG. 6 is a schematic, enlarged top view of a portion of a sample support member coupled to a force transducer. Preferably, the reference compound support member is a cantilever. The cantilever may be constructed of any material known in the art for use in atomic force microscope cantilevers, including Si, $SiO_2$, $Si_3N_4$, $Si_3N_4O_x$, Al, or piezoelectric materials. The chemical composition of the cantilever is not critical and is preferably a material that can be easily microfabricated and that has the requisite mechanical properties so that it can be used for atomic force microscope measurements. Likewise, the cantilever may be in any size and shape known in the art for atomic force microscope cantilevers, except that, unlike conventional cantilevers, it does not rely on having a stylus or probe tip on its free end. Instead, the cantilever has a surface region at the free end that is chemically modified by the immobilization of at least one reference compound thereon. Preferably, the cantilever is rectangular (a "diving board" shape) or "V" shaped. The size of the cantilever preferably ranges from about 5 microns to about 1000 microns in length, from about 1 micron to about 100 microns in width and from about 0.04 microns to about 5 microns in thickness. Typical atomic force microscope cantilevers are about 100 microns in length, about 20 microns in width and about 0.3 microns in thickness. In general, increasing the size of the cantilever allows for a larger chemically modified surface region, allowing for a greater number of molecules to be immobilized thereon. However, increasing the size of the cantilever generally decreases the sensitivity of the cantilever to specific intermolecular interactions and reduces the accuracy of force measurements.

The fixed end of the cantilever may be adapted so that the cantilever fits or interfaces with a cantilever-holding portion of a conventional atomic force microscope.

The chemically modified surface region of the cantilever is on the portion of the cantilever that, when the cantilever is incorporated into an atomic force microscope, faces the sample support member. The surface region is preferably a substantially flat area of at least 0.01 square microns near the end of the cantilever.

The surface region of the free end of the cantilever may be modified to immobilize a reference compound by any method known in the art for immobilization of a chemical entity on a substrate. Typically, the surface region will have billions or trillions of molecules of the reference compound immobilized thereon.

Figure 4:
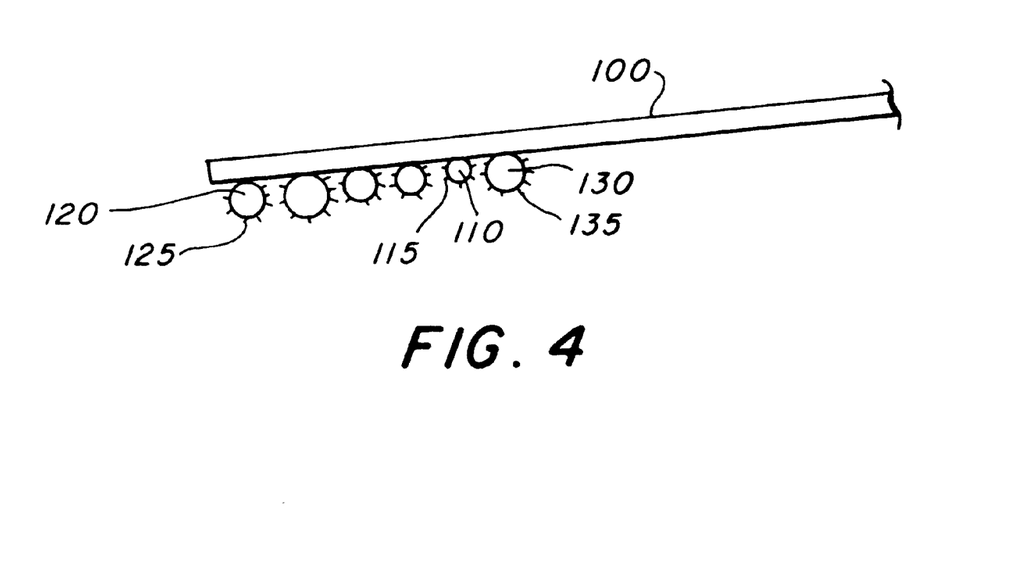
FIG. 4 is a schematic, enlarged side view of the free end of the cantilever according to one embodiment of the present invention.

In an alternative embodiment, the surface region of the cantilever may be modified by immobilizing beads thereon. Beads of specified sizes can be used to calibrate the radii of curvature or other geometric attributes of the protrusions of the sample support member. Also, beads can be used as a way of attaching a plurality of different reference compounds to the cantilever. Different reference compounds may be immobilized onto different sizes of beads, that is, with each reference compound immobilized on a specific size of bead, and the beads may then be immobilized randomly onto the cantilever. In taking measurements of the interaction of reference compounds with sample compounds immobilized on a sample support member of the present invention, particular reference compounds may be distinguished from each other by the size of the bead to which they are attached. This embodiment provides a convenient way to immobilize a plurality of different reference compounds on the cantilever. Examples of bead sizes of different categories that can be distinguished from each other are 1–2 nm beads, 10–15 nm beads and 20–25 nm beads. This embodiment is shown in FIG. 4, which is a schematic, enlarged side view of the free end of a cantilever 100 having small-sized beads 110 having a first reference compound 115 immobilized thereon, medium-sized beads 120 having a second reference compound 125 immobilized thereon, and large beads 130 having a third reference compound 135 immobilized thereon.

Figure 5:
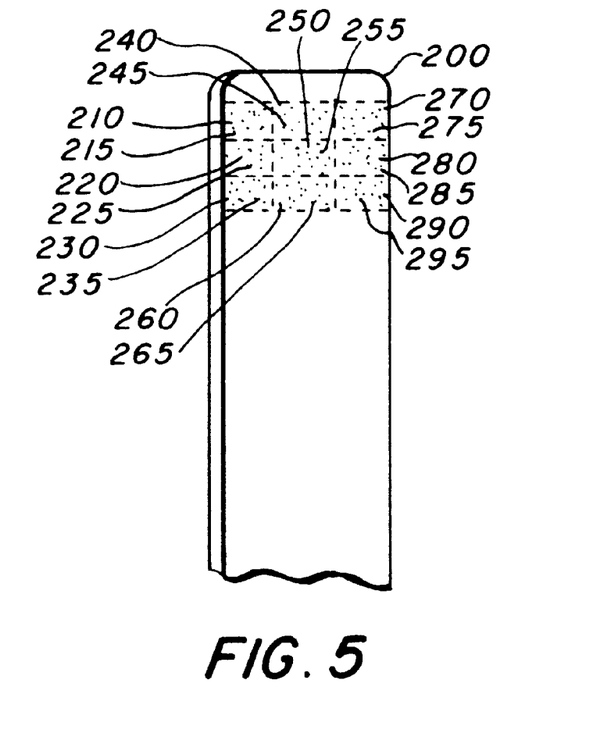
FIG. 5 is a schematic, enlarged bottom view of the free end of the cantilever according to another embodiment of the present invention.

In another alternative embodiment, the surface region of the cantilever or reference compound support member may be subdivided into spatially addressable subregions, with a different reference compound immobilized on each subregion. The cantilever of this embodiment may be created by any method known in the art for creating spatially addressable arrays of immobilized compounds, such as by photopatterning. Although the number of spatially addressable subregions is limited only by the resolution of patterning techniques used to create the subregions and by the resolution of whatever method is used to control the relative position of the cantilever and the sample support member, preferably the number of subregions is about ten or less. This embodiment is shown in FIG. 5, which is a schematic, enlarged bottom view of the free end of a cantilever 200 having subregions 210,220,230,240,250,260,270,280, and 290 having reference compounds 215, 225, 235, 245, 255, 265, 275, 285, and 295 immobilized thereon.

By immobilizing as many as 10 different reference compounds on the surface region of the reference compound support member and as many as 1,000 different sample molecules on the protrusions of the sample support member, it is possible to study as many as 10,000 different molecular interactions without changing the reference compound support member or the sample support member. The methods and apparatus of the present invention can be used to study or screen receptor/ligand interactions, antibody/antigen interactions and interactions of DNA or RNA with complimentary strands. For example, a receptor can be immobilized on the surface region of the reference compound support member and a large library of candidate ligands can be screened to determine whether any of them interact with the receptor and to measure the strength of the interaction. With the present invention, rapid, efficient and statistically rigorous large-scale screening of candidate entities for pharmaceutical and agricultural utility becomes possible. Alternatively, a ligand can be immobilized on the surface region of the reference compound support member and a library of candidate receptors may be screened to determine if the ligand interacts with any of them. Similar methods can be used to screen antibody/antigen interactions and the interactions of DNA or RNA with complimentary strands.

To study molecular interactions between a reference compound and a sample compound, the relative position and orientation of the reference compound support member and the sample support member may be controlled by any known means to select a particular protrusion and to cause an interaction between the reference compound immobilized on the surface region of the reference compound support member and the sample compound immobilized on the apical substrate area of the selected protrusion. Either the reference compound support member or the sample support member or both can be moved, scanned or oscillated. If the cantilever has different reference compounds immobilized on different subregions, the relative position of the cantilever and the sample substrate member may also be controlled so that only a selected subregion of the cantilever interacts with a selected protrusion. Preferably, the means for controlling the relative position and orientation of the cantilever and the sample support member is achieved through the use of piezo-electric actuators, which can convert electrical signal into mechanical displacements with sub-nanometer resolution.

Any physical parameter associated with the interaction between a reference compound and a sample compound that can be measured by atomic force microscopy can be measured by the apparatus and method of the present invention. Physical parameters include, but are not limited to, adhesion, elasticity, and changes in resonant properties, such as amplitude, frequence, and phase. The physical parameters may be measured by any known means including, but not limited to, optical deflection, optical interferometry, and piezoelectric effects. Preferably, forces of interaction between the reference compound and the sample compound when they are brought into or out of contact or into or out of proximity with each other are measured by measuring deflections of the cantilever from its equilibrium position. Deflections of the cantilever may be measured by a number of techniques, including by reflecting a laser beam off the back of the cantilever onto a position sensitive detector.

Measurements may be carried out in any medium or environmental conditions used in atomic force microscopy including, but not limited to, under ambient conditions or under a liquid medium. In a liquid medium, experimental conditions such as pH, ionic concentration, and the presence of inhibitors or competitors can be controlled and varied.

Commercially available atomic force microscope instruments may be used for controlling the relative position of the cantilever and the sample support member and for measuring physical parameters associated with the interaction between reference compounds on the cantilever and sample compounds on the sample support member. Typically, commercial atomic force microscopes have removable cantilevers and sample supports, so these instruments may be modified by simply substituting the cantilevers and sample support members of the present invention. The process of carrying out measurements may be automated and computerized, so that a large number of sample compounds, such as in a combinatorial library, can be analyzed rapidly, efficiently and with statistical rigor. The cantilever and sample support member of the present invention may also be used with an atomic force microscope of a type that has multiple, independently controlled cantilevers, such as is described, for example, in U.S. Pat. No. 5,047,633 to Finlan et al, incorporated herein by reference.

The apparatus of the present invention can also be used as a sensor of environmental changes. In a sensor, compounds having a known interaction are used as the reference compound and the sample compound. A change in the interaction between the reference compound and the sample compound indicates an environment change, such as the presence of interfering molecules. The use of an atomic force microscope as a sensor is described, for example, in U.S. Pat. No. 5,372,930 to Colton et al.

Having described the invention, the following examples are given to illustrate specific applications of the invention, including the best mode now known to perform the invention. These specific examples are not intended to limit the scope of the invention described in this application.

EXAMPLE

A sample support member having a microfabricated array of tapered protrusions was created by standard silicon microfabrication techniques. Specifically, a silicon wafer was processed by forming an oxide layer and then patterning the layer with a photoresist pattern having systematically varying radii. The exposed oxide was then etched away, leaving behind protected circular mask islands or oxide caps. By anisotropic etching, the silicon layer was etched around and underneath the oxide caps to create capped, pyramid-shaped protrusions. The etching was continued until the caps became detached. The remaining structures were touched up by oxide formation and removal to produce an array of pyramid-shaped protrusions with systematically varied apical radii of curvature. Streptavidin was immobilized on the apices of the protrusions. Biotinylated PEG and amino silane were immobilized on a Digital Instruments NanoProbe silicon cantilever 20 $\mu$m wide, 2 $\mu$m thick and 440 $\mu$m long with a nominal force constant of 0.08 N/m. The sample support member and the cantilever were fitted into a modified commercial optical beam deflection based atomic force microscope (Digital Instruments Nanoscope IIIa), which was used to measure the forces of adhesion associated with the separation of the cantilever and the sample support member. In this process, the cantilever was centered over one of the pyramidal protrusions and the z-piezo was excited with a triangle wave, resulting in a relative vertical motion of 3 $\mu$m at 10 Hz between the cantilever and the protrusion. A stepper motor was used to lower the cantilever into close proximity of the apex of the protrusion (less than 2 $\mu$m, but not touching). At this point, the z-piezo range and rate were reduced to 500 nm and 1 Hz respectively. A triggering algorithm was initiated so that the cantilever was inhibited from applying more than 1.0 nN of load to the protrusion apex. Adhesion measurements were taken and force curves were recorded. The cantilever was then positioned over another protrusion and measurements were repeated.

Obviously, many modifications and variations of the present invention are possible in light of the above teachings. It is therefore to be understood that, within the scope of the appended claims, the invention may be practiced otherwise than as specifically described.

What is claimed is:

1. A sample support member for atomic force microscopy comprising a sample support base having a plurality of tapered or rounded protrusions, each protrusion having an apical substrate region that has been chemically modified by the immobilization thereon of a sample compound or of a linking compound that is capable of binding a sample compound, wherein the sample compounds or linking compounds on each of the protrusions may be the same or different.

2. The sample support member of claim 1 wherein the protrusions are pyramidal.

3. The sample support member of claim 1 wherein the protrusions are conical.

4. The sample support member of claim 1 wherein the protrusions are hemispherical.

5. The sample support member of claim 1 wherein the height of each protrusions is between about 1 and about 10 $\mu$m, the apical radius of curvature of each protrusions is between about 5 and about 1000 nm, and the distance between adjacent protrusions is between about 2 and about 50 $\mu$m.

6. The sample support member of claim 5 wherein each protrusion has a radius of curvature sufficiently small so that a single isolated molecule of a sample compound can be immobilized on the apical substrate region.

7. The sample support member of claim 1 wherein the apical substrate regions of the protrusions have been chemically modified by the immobilization thereon of sample compounds that are members of a combinatorial library.

8. The sample support member of claim 7 wherein the sample compounds have been synthesized in situ on the apical substrate regions of the protrusions.

9. The sample support member of claim 1 wherein the protrusions are in a planar array.

10. The sample support member of claim 1 wherein the sample support member is in the form of a plurality of terraces, each terrace having at least one row of protrusions.

11. The sample support member of claim 1 wherein the sample support base is coupled to a force transducer.

12. The sample support member of claim 1 wherein the apical substrate regions of the protrusions have been chemically modified by the immobilization thereon of a linking compound that is capable of binding a thiol group of a thiol-containing sample compound.

13. The sample support member of claim 1 wherein the apical substrate regions of the protrusions have been chemically modified by the immobilization thereon of a linking compound that is capable of binding an amine group of an amine-containing compound.

14. The sample support member of claim 1 wherein the apical substrate regions of the protrusions have been chemically modified by the immobilization thereon of a linking compound that is photoactivatable.

15. The sample support member of claim 1, further including means for distinguishing the protrusions from each other by optical microscopy.

16. The sample support member of claim 15 wherein the means for distinguishing the protrusions from each other comprises markings on the sample support base that are visible through an optical microscope.

17. A sample support member for atomic force microscopy comprising a sample support base having a planar array of tapered or rounded protrusions, wherein the height of each protrusions is between about 1 and about 10 $\mu$m, the apical radius of curvature of each protrusions is between about 5 and about 1000 nm, and the distance between adjacent protrusions is between about 2 and about 50 $\mu$m and wherein each protrusion has an apical substrate region that has been chemically modified by the immobilization thereon of a sample compound or of a linking compound that is capable of binding a sample compound, wherein the sample compounds or linking compounds on each of the protrusions may be the same or different.

18. A cantilever for an atomic force microscope comprising a cantilever body having a fixed end and a free end, the free end having a surface region having a plurality of spatially addressable subregions, each subregion having been chemically modified by the immobilization of a different reference compound thereon.

19. The cantilever of claim 18 wherein the surface region of the free end of the cantilever is substantially flat and has a surface area of at least 0.01 square microns.

20. A cantilever for an atomic force microscope comprising a cantilever body having a fixed end and a free end, the free end having a surface region, the surface region having a plurality of beads of different size categories immobilized thereon, the beads having reference compounds immobilized thereon, wherein each size category of bead has a different reference compound immobilized thereon.

21. An apparatus for measuring an interaction between a reference compound and at least one sample compound, the apparatus comprising:
  a sample support member having a plurality of protrusions, each protrusion having an apical substrate region that has been chemically modified by the immobilization of a sample compound thereon, wherein the sample compounds on each of the protrusions may be the same or different,
  a reference compound support member having a surface region that has been chemically modified by the immobilization of at least one reference compound thereon,
  means for controlling the relative position and orientation of the reference compound support member and the sample support member to select a particular protrusion and to cause an interaction between the reference compound immobilized on the surface region of the reference compound support member and the sample compound immobilized on the apical substrate area of the selected protrusion, and
  means for measuring a physical parameter associated with the interaction between the reference compound and the sample compound.

22. The apparatus of claim 21 wherein the protrusions are tapered or rounded.

23. The apparatus of claim 21 wherein the protrusions are pyramidal.

24. The apparatus of claim 21 wherein the protrusions are conical.

25. The apparatus of claim 21 wherein the protrusions are hemispherical.

26. The apparatus of claim 21 wherein the protrusions are in a planar array.

27. The apparatus of claim 21 wherein the height of each protrusions is between about 1 and about 10 $\mu$m, the apical radius of curvature of each protrusions is between about 5 and about 1000 nm, and the distance between adjacent protrusions is between about 2 and about 50 $\mu$m.

28. The apparatus of claim 21 wherein the chemically modified surface region of the reference compound support member is substantially flat and has a surface area of at least 0.01 square microns.

29. The apparatus of claim 21 wherein the chemically modified surface region of the reference compound support member includes a plurality of spatially addressable subregions, each subregion having been chemically modified by the immobilization of a different reference compound thereon.

30. The apparatus of claim 21 wherein the surface area of the apical substrate region of each protrusion is less than the surface area of the surface region of the free end of the cantilever.

31. The apparatus of claim 21 wherein the reference compound is a receptor and the sample compounds are known or candidate complimentary ligands.

32. The apparatus of claim 21 wherein the reference compound is a ligand and the sample compounds are known or candidate complimentary receptors.

33. The apparatus of claim 21 wherein the reference compound is an antibody and the sample compounds are known or candidate complimentary antigens.

34. The apparatus of claim 21 wherein the reference compound is an antigen and the sample compounds are known or candidate complimentary antibodies.

35. The apparatus of claim 21 wherein the reference compound is a single strand of DNA or RNA and the sample compounds are known or candidate complimentary strands of DNA or RNA.

36. The apparatus of claim 21 wherein the sample compounds are members of a combinatorial library.

37. The apparatus of claim 21 wherein the sample compounds are members of a combinatorial library and wherein each sample compound has been synthesized in situ on the apical substrate region of a protrusion of the sample support member.

38. The apparatus of claim 21, wherein the reference compound support member and the sample support member are immersed in a fluid.

39. The apparatus of claim 21 wherein the means for measuring a physical parameter associated with the interaction between the reference compound and the sample compound comprises a force transducer coupled to the sample support member.

40. The apparatus of claim 21 wherein the means for measuring a physical parameter associated with the interaction between the reference compound and the sample compound comprises a force transducer coupled to the reference compound support member.

41. The apparatus of claim 21 wherein the reference compound support member is a cantilever having a fixed end and a free end, and wherein the chemically modified surface region is on the free end of the cantilever.

42. An apparatus for measuring an interaction between at least one reference compound and at least one sample compound by atomic force microscopy, the apparatus comprising:
   a sample support member having a plurality of protrusions, each protrusion having an apical substrate region that has been chemically modified by the immobilization of a sample compound thereon, wherein the sample compounds on each of the protrusions may be the same or different,
   a cantilever having a fixed end and a free end, the free end having a surface region that has been chemically modified by the immobilization of at least one reference compound thereon,
   means for controlling the relative position and orientation of the cantilever and the sample support member to select a particular protrusion and to cause an interaction between a reference compound immobilized on the surface region of the free end of the cantilever and the sample compound immobilized on the apical substrate area of the selected protrusion, and
   means for measuring a physical parameter associated with the interaction between the reference compound and the sample compound.

43. The apparatus of claim 42 wherein the chemically modified surface region of the cantilever includes a plurality of spatially addressable subregions, each subregion having been chemically modified by the immobilization of a different reference compound thereon.

44. An apparatus for measuring an interaction between at least one reference compound and at least one sample compound by atomic force microscopy, the apparatus comprising:
   a sample support member having a plurality of protrusions, each protrusion having an apical substrate region that has been chemically modified by the immobilization of a sample compound thereon, wherein the sample compounds on each of the protrusions may be the same or different,
   a cantilever having a fixed end and a free end, the free end having a surface region that has been chemically modified by the immobilization of at least one reference compound thereon,
   wherein the sample support member is adapted to interface with a sample stage portion of an atomic force microscope and the cantilever is adapted to interface with cantilever-holding portion of an atomic force microscope.

45. An apparatus for measuring an interaction between at least one reference compound and at least one sample compound by atomic force microscopy, the apparatus comprising:
   a sample support member having a planar array of tapered or rounded protrusions, wherein the height of each protrusions is between about 1 and about 10 $\mu$m, the apical radius of curvature of each protrusions is between about 5 and about 1000 nm, and the distance between adjacent protrusions is between about 2 and about 50 $\mu$m and wherein each protrusion has an apical substrate region that has been chemically modified by the immobilization of a sample compound thereon, wherein the sample compounds on each of the protrusions may be the same or different,
   a cantilever having a fixed end and a free end, the free end having a substantially flat surface region that has been chemically modified by the immobilization of at least one reference compound thereon, the surface region having an area of at least 0.01 square microns,
   wherein the sample support member is adapted to interface with a sample stage portion of an atomic force microscope and the cantilever is adapted to interface with a cantilever-holding portion of an atomic force microscope.

46. The apparatus of claim 45 wherein the chemically modified surface region of the cantilever includes a plurality of spatially addressable subregions, each subregion having been chemically modified by the immobilization of a different reference compound thereon.

47. A method of assaying at least one sample compound for interaction with at least one reference compound, the method comprising: the steps of
   (a) providing (1) a sample support member having a plurality of protrusions, each protrusion having an apical substrate region and (2) a reference compound support member having a surface region,
   (b) chemically modifying the apical substrate region of each protrusion of the sample support member to immobilize a sample compound thereon, wherein the sample compounds on each of the protrusions may be the same or different,
   (c) chemically modifying the surface region of the reference compound support member to immobilize at least one reference compound thereon,
   (d) coupling the sample support member and the reference compound support member to apparatus that includes means for controlling the relative position and orientation of the sample support member and the reference compound support member to select a particular protrusion of the sample support member and to cause an interaction between a reference compound immobilized on the surface region of the reference compound support member and the sample compound immobilized on the apical substrate area of the selected protrusion, and means for measuring a physical parameter associated with the interaction between the reference compound and the sample compound
   (e) controlling the relative position and orientation of the reference compound support member and the sample support member to select a particular protrusion and to cause an interaction between a reference compound and the sample compound immobilized on the selected protrusion, and (f) measuring a physical parameter associated with the interaction between the reference compound and the sample compound on the selected protrusion.

48. The method of claim 47 wherein, at the conclusion of step (f), steps (e) and (f) are repeated with a different selected protrusion and/or a different reference compound.

49. A method of assaying at least one sample compounds for interaction with at least one reference compound, the method comprising: the steps of (a) providing an atomic force microscope that includes
a sample support member having a plurality of protrusions, each protrusion having an apical substrate region and
a cantilever having a fixed end and a free end, the free end having a surface region having a plurality of spatially addressable subregions, (b) chemically modifying the apical substrate region of each protrusion so that each protrusion has the same or a different sample compound immobilized thereon, (c) chemically modifying the spatially addressable subregions of the surface region of the free end of the cantilever to immobilize a different reference compound on each subregion, (d) controlling the relative position and orientation of the cantilever and the sample support member to select a particular subregion of the cantilever and a particular protrusion to cause an interaction between the reference compound immobilized on the selected subregion and the sample compound immobilized on the selected protrusion, and (e) measuring a physical parameter associated with the interaction between the selected reference compound and the selected sample compound.

50. A method of assaying at least one sample compounds for interaction with at least one reference compound, the method comprising: the steps of (a) providing an apparatus that includes
a sample support member having a planar array of tapered or rounded protrusions, wherein the height of each protrusions is between about 1 and about 10 $\mu$m, the apical radius of curvature of each protrusions is between about 5 and about 1000 nm, and the distance between adjacent protrusions is between about 2 and about 50 $\mu$m and wherein each protrusion has an apical substrate region that has been chemically modified by the immobilization of a sample compound thereon, wherein the sample compounds on each of the protrusions may be the same or different, and
a cantilever having a fixed end and a free end, the free end having a substantially flat surface region having an area of at least 0.01 square microns and wherein the surface region is subdivided into a plurality of spatially addressable subregions, (b) chemically modifying the apical substrate region of each protrusion to immobilize a sample compound thereon, wherein the sample compounds on each of the protrusions may be the same or different, (c) chemically modifying the spatially addressable subregions of the surface region of the free end of the cantilever to immobilize a different reference compound on each subregion, (d) coupling the sample support member to a sample stage portion of an atomic force microscope and coupling the cantilever to a cantilever-holding portion of the atomic force microscope, wherein the atomic force microscope includes means for controlling the relative position and orientation of the cantilever and the sample support member to select a particular protrusion and to cause an interaction between a reference compound immobilized on the surface region of the free end of the cantilever and the sample compound immobilized on the apical substrate area of the selected protrusion, and means for measuring a physical parameter associated with the interaction between the reference compound and the sample compound, (e) controlling the relative position and orientation of the cantilever and the sample support member to select a particular protrusion and to cause an interaction between a reference compound immobilized on the selected subregion and the sample compound immobilized on the selected protrusion, and (f) measuring a physical parameter associated with the interaction between the selected reference compound and the selected sample compound.

* * * * *